Sept. 7, 1948.  L. E. JONES  2,448,598
VARIABLE SPEED TRANSMISSION
Filed Nov. 20, 1946  2 Sheets-Sheet 1

INVENTOR.
LLOYD E. JONES
BY John W. Michael
ATTORNEY.

Sept. 7, 1948.　　　　　L. E. JONES　　　　2,448,598
VARIABLE SPEED TRANSMISSION
Filed Nov. 20, 1946　　　　　　　　　　　2 Sheets-Sheet 2

INVENTOR.
LLOYD E. JONES
BY John W. Michael
ATTORNEY.

Patented Sept. 7, 1948

2,448,598

UNITED STATES PATENT OFFICE 2,448,598

VARIABLE-SPEED TRANSMISSION

Lloyd E. Jones, Milwaukee, Wis., assignor to Graham Transmissions, Inc., Milwaukee, Wis., a corporation of Delaware Application November 20, 1946, Serial No. 711,049

12 Claims. (Cl. 74—281)

This invention relates to improvements in variable speed transmissions of the type which employ an assembly of planetary rollers intermediate the drive and driven shafts and a non-rotatable encircling contact member to regulate the planetary action of the rollers.

In transmissions of this type, the rollers are angularly displaced under the influence of centrifugal force to make frictional driving contact with the encircling member. This centrifugal force is a factor of the speed of rotation as controlled by the driving motor. If the speed of the driving motor is too low, the frictional contact may not be sufficient to fully develop the potential capacity of the transmission. To offset this deficiency it has been the practice to add a non-planetary eccentric weight to the bearings at the large end of the rollers. Some of the disadvantages of this method of supplementing centrifugal force are that guides are required at the large end of the rollers for such weights and the weights require considerable extra space and unduly enlarge the housing of the transmission.

It is therefore one of the objects of this invention to provide a variable speed transmission of the character described in which centrifugal force is supplemented by non-planetary weights without increasing the size of the housing for the transmission.

Another object of the invention is to provide a variable speed transmission of the character described in which centrifugal force is supplemented without substantially increasing the normal weight of a transmission, the centrifugal force of which is not supplemented.

These objects are obtained by forming the non-planetary weights, so that they partially surround the narrow end of the tapered rollers, and positioning such weights in the space normally existing between such narrow ends and the rotary carrier for the rollers. The weights are attached to the long arms of the levers pivotally fulcrumed to the roller carrier adjacent the large ends of the tapered rollers. The short arms of these levers engage pressure blocks mounted on the large ends of the rollers. As the carrier rotates under control of the driving motor, the centrifugal force developed by these weights, acting through the relatively high mechanical advantage obtained by the levers, greatly supplements the centrifugal force developed by the rollers themselves and thus there is maintained at slower operating speeds of the driving motor sufficient frictional driving contact or working pressure between the rollers and the regulatory ring. Space not otherwise utilized can therefore be used to accommodate the non-planetary eccentric weights and levers and because of the high mechanical advantage obtained the effective force of such weights is so increased that only a relatively small amount of additional weight is necessary. This has advantageous commercial results in that substantially the same power output may be obtained from the transmission when using, for example, an 1800 R. P. M. motor as would be obtained from using a 3600 R. P. M. motor. The slower driving motors are less costly and the transmission would be subjected to less strains from the slower motor.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1:
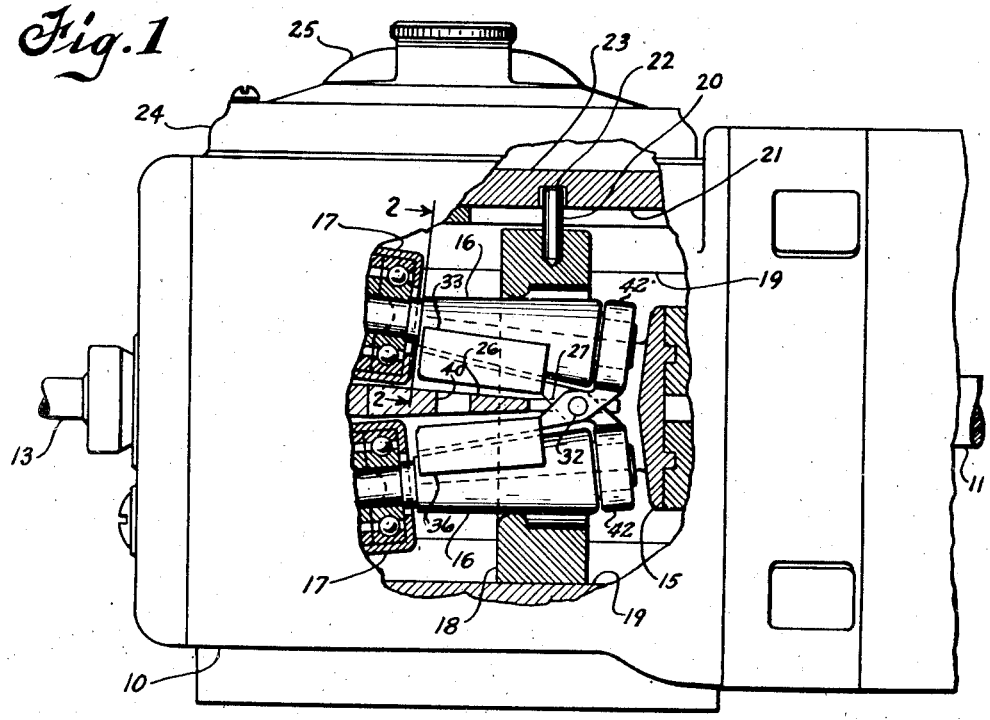
Fig. 1 is a view in side elevation of a transmission embodying the invention, with parts being broken away and shown in section for the sake of clarity in illustration.
Figure 2:
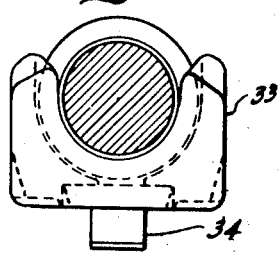
Fig. 2 is a fragmentary view in section taken on the line 2—2 of Fig. 1.
Figure 3:
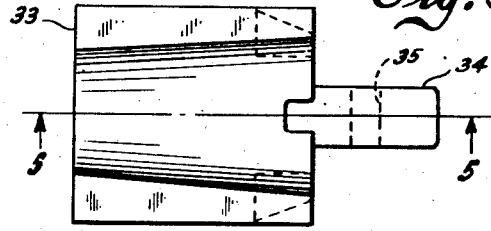
Fig. 3 is a top plan view of the upper of the non-planetary eccentric weights shown in Fig. 1.
Figure 4:
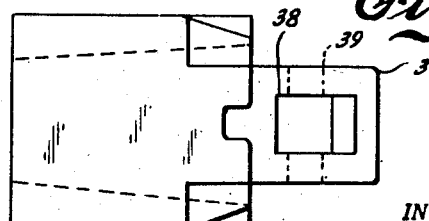
Fig. 4 is a top plan view of the lower of the non-planetary eccentric weights shown in Fig. 1.
Figure 5:
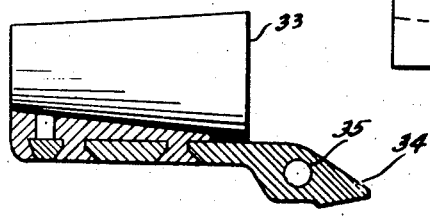
Fig. 5 is a sectional view on line 5—5 of Fig. 3.
Figure 6:
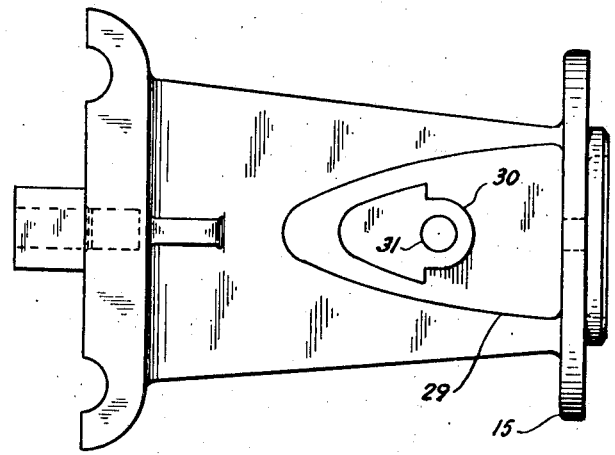
Fig. 6 is a view in side elevation of the rotary carrier for the planetary rollers.
Figure 7:
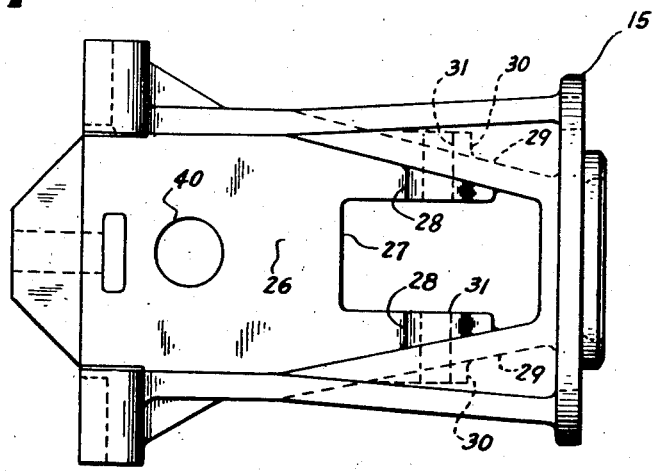
Fig. 7 is a top plan view of the carrier of Fig. 6.

Referring to the drawings by reference numerals, the variable speed transmission, with exception of the details hereinafter described in particular, is substantially identical in construction with that disclosed in Patent 2,405,957, issued August 20, 1946, to Graham Transmissions, Inc., on the application of Lloyd E. Jones. It comprises generally a housing 10 in which is mounted a drive shaft 11, a driven shaft 13, and a rotary carrier 15, all coaxially arranged. A pair of tapered planetary rollers 16 have their narrow ends mounted in bearings 17. The bearings 17 are pivotally mounted in the carrier 15. Thus the rollers 16 have angular displacement and rotation with respect to the carrier 15. As the rollers swing outwardly, their outer lateral extremities are substantially parallel to the axis of the carrier and contact the non-rotatable encircling contact member or control ring 18 to provide the driving engagement. In order to regulate the planetary action of the rollers, the control ring 18 is supported, centered, and guided for movement lengthwise of the rollers by longitudinal ribs or lands 19 formed at intervals on the inner wall of the housing. It is held against rotation by a pin or follower 20 which projects upwardly from the ring through an elongated slot 21 in the housing. To actuate the lengthwise movement of the control member the follower 20 has a sliding engagement in a cam groove 22 formed on the underside of a disk 23 which is journaled in the cover plate 24 and operated by the rotation of the dial 25.

The rotary carrier 15 is also substantially similar in construction to that described in the aforesaid patent. Its central web 26, however, is provided with a slot 27 which accommodates the levers of the supplemental loading mechanism. Bosses 28 are formed on the web 26 on opposite sides of the slot 27 and the converging walls 29 are provided on their outer surfaces with bosses 30 to form an extension of the bosses 28. These bosses are bored as at 31 to provide a bearing for a pivot pin 32 comprising part of such supplemental loading mechanism.

The supplemental loading mechanism comprises two levers pivotally mounted to the carrier 15 by the common pivot pin 32. Each of these levers has a short arm and a long arm. The short arm bears against the inner extremity of the outer race of a bearing which acts as a pressure block 42 mounted on the wide end of each roller 16 to transmit the supplemental loading force to the rollers and hence to increase the working pressure between the ring and rollers. Non-planetary weights are mounted on the long arms to obtain a mechanical advantage. The levers are substantially of the same shape except that the one designated 37 is the female lever. It has a slot 38 through which the male lever 34 extends to permit the levers to be mounted in crossed or scissor-like fashion. The lever 34 has a bearing 35 and the lever 37 has a bearing 39 by which they are mounted on the pin 32. The long arms of the levers extend between the web 26 and a respective roller 16 toward the narrow ends thereof. On these long arms there are mounted between each roller 16 and web 26 the non-planetary eccentric weights. These weights are of identical shape. Each has a body portion which is mounted on the respective lever. Each has side portions which partly surround the narrow end of the rollers 16. The body and sides are thicker at the outer ends of the weights in order to utilize as much as possible the space resulting from the tapered shape of the roller. In order to identify the weights with respect to a respective lever, as viewed in Fig. 1, the upper weight is designated 33 and the lower weight 36. With this arrangement force generated in each respective weight will be transmitted to the roller on the opposite side of the web 26. One practical way of making a unit of a respective lever and weight is to form and machine the lever of steel and cast the weight, moulding it to the lever in the casting process.

To assist in making an effective bond between the cast weight and the machined lever, the lever may be provided with countersunk openings into which the cast metal is formed, as is a standard practice in this art.

From the foregoing it will be observed that a variable speed transmission having supplemental loading has been produced which is simple and compact in construction and utilizes to the fullest extent the available waste space within the housing. The eccentric weights 33 and 36 are mounted in the space between the narrow end of the rollers 16 and the web 26. These weights are so constructed that their centers of gravity are near their outer ends. In addition, the weights are mounted on the long arms of the levers and the force is applied to the ends of the rollers by the short arms of the levers to greatly increase the centrifugal force generated in the weights as the carrier rotates. Thus, weights of substantially lesser amount than would otherwise be required may be used and still there is attained the desired working pressure between ring and rollers.

In the operation of the transmission, the carrier 15 is rotated at a constant speed under the control of a driving motor connected to the driving shaft 11. As is customary with these types of transmission, centrifugal force urges the rollers 16 outwardly about the pivotally mounted bearing 17 and into pressure contact with the control ring 18 to regulate the planetary action of the rollers. If a slower input speed is provided, the working pressure between the rollers and the ring would not be sufficient to transmit the amount of horse-power of which the transmission is otherwise capable of transmitting. However, this working pressure is greatly supplemented by the action of the non-planetary eccentric weights 33 and 36 acting through their respective levers 34 and 37. The rotation of the carrier 15 generates centrifugal force which urges these weights outwardly about the pivot 32. This force is multiplied and applied to the outer ends of the rollers 16, thus adding to and supplementing the working pressure between the rollers and the ring.

Certain commercial advantages result from the ability of the transmission to transmit the full horse-power for which it is designed when operated, for example, at input speeds of 3600 R. P. M. while operating at input speeds of 1800 R. P. M. Driving motors designed to operate at 1800 R. P. M. are considerably less expensive than those designed to operate at 3600 R. P. M. In addition, the lowering of the speed of operation of all the working parts of the transmission decreases vibration, noise and mechanical stresses. The fact that the transmission may operate efficiently at lower speeds makes it available for a greater variety of applications. In addition to these advantages there are advantages which arise in the manufacture of a line of such transmissions. For example, two transmissions of different input speed ratings but having substantially the same horse-power output may be constructed from identical parts with the exception of the size of the planetary rollers, the inclusion of bearings on the rollers, and the addition of the eccentric weights and levers. All of the other elements, such as the housing, pivot bearings, control ring, roller carrier, and other like elements, are standard for each of the differently rated transmissions. Thus the cost of manufacture of a more complete line of transmissions is materially lessened by the use of this invention.

Figure 8:
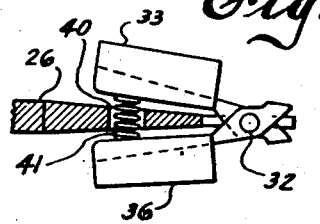
Fig. 8 is a fragmentary sectional view showing a modified form of the invention in which a light supplemental spring has been incorporated with the non-planetary eccentric weights.

In certain applications of the transmission it may be necessary to have some working pressure between the rollers and the ring at the initiating of rotation of the carrier and before it has attained the constant speed of the input motor. Where such pressure is desired, it may be supplied by the modification shown in Fig. 8. In this modification a light compression spring 41 is positioned between the opposed backs of the weights 33 and 36, there being a hole 40 in the web 26 to permit the spring to extend therethrough. Any standard means of centering the ends of the spring in the desired position on the surfaces of the weights, such as small protruding bosses which project into the ends of the spring, or depressions in the surface into which the ends of the spring may fit, may be used. The spring need not be heavy because its force is multiplied by the leverage obtained through the operation of the levers 34 and 37. Thus the spring 41 supplies a working pressure between the rollers and the ring which will be sufficient to cause a planetary action to take place upon the initiating of rotation of the input shaft.

Although only one embodiment of the invention is shown and described herein, it will be understood that this application is intended to cover such changes or modifications as come within the spirit of the invention or scope of the following claims.

I claim:

1. In a variable speed transmission, a rotary carrier, a planetary roller supported in said carrier for angular displacement and rotation with respect thereto, a control member engaged by said roller to regulate the planetary action of said roller, a weight pivotally mounted on said carrier and positioned between said roller and said carrier, and means interconnecting said weight and said roller.

2. In a variable speed transmission, a rotary carrier, an axially movable control ring, a tapered planetary roller engageable with said control ring to regulate the planetary action of said roller, said roller having one end mounted on said carrier to permit said roller to have angular displacement and rotation with respect thereto, a pressure block on the other end of said roller, a lever pivotally mounted on said carrier, one end of said lever being in engagement with said block, and a weight carried by the other end of said lever.

3. In a variable speed transmission, a rotary carrier, an axially movable control ring, a tapered planetary roller engageable with said control ring to regulate the planetary action of said roller, said roller having one end mounted on said carrier to permit said roller to have angular displacement and rotation with respect thereto, a pressure block on the other end of said roller, a lever pivotally mounted on said carrier, one end of said lever being in engagement with said block, and a weight carried by the other end of said lever, said weight being mounted between the narrow end of said roller and said carrier.

4. In a variable speed transmission, a rotary carrier, an axially movable control ring, a tapered planetary roller engageable with said control ring to regulate the planetary action of said roller, said roller having one end mounted on said carrier to permit said roller to have angular displacement and rotation with respect thereto, a pressure block on the other end of said roller, a lever pivotally mounted on said carrier, one end of said lever being in engagement with said block, and a weight carried by the other end of said lever, said weight being shaped to partially encircle the narrow end of said roller and positioned between said narrow end and said carrier.

5. In a variable speed transmission, a rotary carrier, a pair of tapered planetary rollers, the narrow ends of which are mounted on said carrier so as to permit each roller to have angular displacement and rotation with respect to said carrier, a ring encircling and engageable with said rollers to regulate the planetary action thereof, a pair of levers pivotally mounted on said carrier, said levers having long arms and short arms, said long arms being interposed between the narrow ends of said rollers and said carrier, means interconnecting the wide ends of the rollers with said short arms, and weights carried by said long arms.

6. In a variable speed transmission, a rotary carrier, a pair of tapered planetary rollers, the narrow ends of which are mounted on said carrier so as to permit each roller to have angular displacement and rotation with respect to said carrier, a ring encircling and engageable with said rollers to regulate the planetary action thereof, a pair of levers pivotally mounted on said carrier, said levers having long arms and short arms, said long arms being interposed between the narrow ends of said rollers and said carrier, means interconnecting the wide ends of the rollers with said short arms, and weights carried by said long arms, said weights being mounted between the narrow ends of said rollers and said carrier.

7. In a variable speed transmission, a rotary carrier having a central web, an opening through said web, a pair of tapered planetary rollers the narrow ends of which are mounted on said carrier so as to permit each roller to have angular displacement and rotation with respect to said carrier, said rollers being positioned on opposite sides of said web, a ring encircling and engageable with said rollers to regulate the planetary action thereof, a pair of levers pivotally mounted on said carrier, a compression spring engaging with an end of each lever to urge said ends apart, said spring extending through said opening, means interconnecting the other end of one of said levers with the wide end of one of said rollers, and means interconnecting the other end of the other of said levers with the wide end of the other of said rollers.

8. In a variable speed transmission, a rotary carrier provided with a central web, a slot in said web, a pair of tapered planetary rollers, the narrow ends of which are mounted on said carrier so as to permit each roller to have angular displacement and rotation with respect to said carrier, each of said rollers being positioned on opposite sides of said web, a ring encircling and engageable with said rollers to regulate the planetary action thereof, a pair of levers each of which extends through said slot and is pivotally mounted on said carrier by a common pivot, said levers having weighted arms positioned between a respective roller and said web, and means interconnecting the other arms of said levers with the free ends of said rollers.

9. In a variable speed transmission, a rotary carrier provided with a central web having a slot therein, a pair of tapered planetary rollers, the narrow ends of which are mounted on said carrier so as to permit each roller to have angular displacement and rotation with respect to said carrier, the wide ends of said rollers being positioned on opposite sides of said web adjacent said slot, pressure blocks mounted on said wide ends, a ring encircling and engageable with said rollers to regulate the planetary action thereof, and a pair of levers pivotally mounted on said carrier at said slot, said levers having long arms and short arms, said long arms being interposed between the narrow end of a respective roller and said web, said short arms engaging a respective block of a roller mounted on the other side of the web from the side on which the long arm of such respective lever extends.

10. In a variable speed transmission, a rotary carrier provided with a central web having a slot therein, a pair of tapered planetary rollers, the narrow ends of which are mounted on said carrier so as to permit each roller to have angular displacement and rotation with respect to said carrier, the wide ends of said rollers being positioned on opposite sides of said web adjacent said slot, pressure blocks mounted on said wide ends, a ring encircling and engageable with said rollers to regulate the planetary action thereof, a pair of levers pivotally mounted on said carrier at said slot, said levers having long arms and short arms, said long arms being interposed between the narrow end of a respective roller and said web, said short arms engaging a respective block of a roller mounted on the other side of the web from the side on which the long arm of such respective lever extends, and weights carried by said long arms, said weights being shaped to partially encircle the narrow ends of said rollers and positioned between said narrow ends and said web.

11. In a variable speed transmission, a rotary carrier provided with a central web having a slot therein, a pair of tapered planetary rollers, the narrow ends of which are mounted on said carrier so as to permit each roller to have angular displacement and rotation with respect to said carrier, the wide ends of said rollers being positioned on opposite sides of said web adjacent said slot, pressure blocks mounted on said wide ends, a ring encircling and engageable with said rollers to regulate the planetary action thereof, a pair of levers having interfitting bearing portions mounted on a single pivot pin carried by said web at said slot, said levers being crossed and having long arms and short arms, said long arms being interposed between the narrow end of a respective roller and said web, said short arms engaging a respective block of a roller mounted on the other side of the web from the side on which the long arm of such respective lever extends, and weights carried by said long arms, said weights being shaped to partially encircle the narrow ends of said rollers and positioned between said narrow ends and said web.

12. In a variable speed transmission, a rotary carrier, an axially movable control ring, a tapered planetary roller engageable with said control ring to regulate the planetary action of said roller, said roller having a small end mounted on said carrier to permit said roller to have angular displacement and rotation with respect thereto, a lever pivotally mounted on said carrier and carrying a weight at one end, its other end being in pressure engagement with the large end of said roller.

LLOYD E. JONES.

REFERENCES CITED

The following references are of record in the file of this patent:

UNITED STATES PATENTS

| Number | Name | Date |
|---|---|---|
| 2,178,395 | Jepson | Oct. 31, 1939 |
| 2,203,637 | Schmitter et al. | June 4, 1940 |